(12) United States Patent
Matsumoto et al.

(10) Patent No.: US 10,290,894 B2
(45) Date of Patent: May 14, 2019

(54) SECONDARY BATTERY AND METHOD FOR MANUFACTURING SAME (75) Inventors: Kazuaki Matsumoto, Tokyo (JP); Daisuke Kawasaki, Tokyo (JP); Masahiro Suguro, Tokyo (JP); Midori Shimura, Tokyo (JP); Yoko Hashizume, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 687 days.

(21) Appl. No.: 13/881,984

(22) PCT Filed: Jun. 23, 2011

(86) PCT No.: PCT/JP2011/064409
§ 371 (c)(1),
(2), (4) Date: Jun. 12, 2013

(87) PCT Pub. No.: WO2012/056765
PCT Pub. Date: May 3, 2012

(65) Prior Publication Data
US 2013/0266875 A1  Oct. 10, 2013

(30) Foreign Application Priority Data

Oct. 29, 2010  (JP) .................................. 2010-243939

(51) Int. Cl.
*H01M 10/056* (2010.01)
*H01M 4/38* (2006.01)
*H01M 4/62* (2006.01)
*H01M 10/0567* (2010.01)
(Continued)

(52) U.S. Cl.
CPC ......... *H01M 10/056* (2013.01); *H01M 4/382* (2013.01); *H01M 4/386* (2013.01);
(Continued)

(58) Field of Classification Search
CPC . H01M 2300/0028; H01M 2300/0037; H01M 2300/0034; H01M 2300/004;
(Continued)

(56) References Cited

U.S. PATENT DOCUMENTS

2003/0215711 A1    11/2003  Aramata et al.
2007/0042267 A1*   2/2007   Kim ..................... H01M 4/505
                                                        429/200

(Continued)

FOREIGN PATENT DOCUMENTS

JP    06-325765 A    11/1994
JP    2003-123740 A   4/2003
(Continued)

*Primary Examiner* — Ula C Ruddock
*Assistant Examiner* — Matthew W Van Oudenaren
(74) *Attorney, Agent, or Firm* — Sughrue Mion, PLLC (57) ABSTRACT

An exemplary embodiment of the present invention is a secondary battery which comprises a negative electrode and a battery electrolyte liquid comprising a supporting salt and a non-aqueous electrolyte solvent; wherein the negative electrode is obtained by pre-forming a SEI coating film on a negative electrode structure which is formed by binding a negative electrode active substance comprising a metal (a) that can be alloyed with lithium, a metal oxide (b) that can absorb and desorb lithium ion and a carbon material (c) that can absorb and desorb lithium ion, to a negative electrode current collector with a negative electrode binder, and wherein the non-aqueous electrolyte solvent contains at least an ionic liquid.

22 Claims, 1 Drawing Sheet (51) Int. Cl.
*H01M 10/0568* (2010.01)
*H01M 10/0569* (2010.01)
*H01M 10/0585* (2010.01)

(52) U.S. Cl.
CPC ........... *H01M 4/621* (2013.01); *H01M 4/622* (2013.01); *H01M 4/625* (2013.01); *H01M 10/0567* (2013.01); *H01M 10/0568* (2013.01); *H01M 10/0569* (2013.01); *H01M 10/0585* (2013.01); *Y10T 29/49115* (2015.01)

(58) Field of Classification Search
CPC ..... H01M 2300/0042; H01M 10/0569; H01M 10/0568; H01M 10/0567; H01M 10/056; H01M 10/0585; H01M 4/622; H01M 4/621; H01M 4/382; H01M 4/625; H01M 4/386
See application file for complete search history.

(56) References Cited

U.S. PATENT DOCUMENTS

| | | | | |
|---|---|---|---|---|
| 2009/0017386 A1* | 1/2009 | Xu | ........................ | H01M 4/40 429/331 |
| 2009/0068566 A1* | 3/2009 | Park | ...................... | H01M 4/485 429/331 |
| 2009/0239151 A1* | 9/2009 | Nakanishi | ........... | H01M 4/0428 429/231.95 |
| 2009/0253044 A1* | 10/2009 | Nogi | ..................... | H01M 6/164 429/326 |
| 2010/0209782 A1* | 8/2010 | Choi | ................... | H01M 4/0452 429/332 |
| 2011/0070504 A1* | 3/2011 | Matsumoto | ....... | H01M 10/0525 429/325 |
| 2011/0318614 A1* | 12/2011 | Takeshi | ................. | H01M 6/166 429/50 |

FOREIGN PATENT DOCUMENTS

| | | | |
|---|---|---|---|
| JP | 2004-047404 A | | 2/2004 |
| JP | 2008-153117 A | | 7/2008 |
| JP | 2008-257963 A | | 10/2008 |
| JP | 2009-199960 A | | 9/2009 |
| JP | 2009-230899 A | | 10/2009 |
| JP | 2009-259723 A | | 11/2009 |
| JP | 2010-192430 A | | 9/2010 |
| WO | WO2009142251 | * | 11/2009 |
| WO | WO2010095533 | * | 8/2010 |

* cited by examiner

SECONDARY BATTERY AND METHOD FOR MANUFACTURING SAME

CROSS REFERENCE TO RELATED APPLICATIONS

This application is a National Stage of International Application No. PCT/JP2011/064409, filed on Jun. 23, 2011, which claims priority from Japanese Patent Application No. 2010-243939, filed on Oct. 29, 2010, the contents of all of which are incorporated herein by reference in their entirety.

TECHNICAL FIELD

An embodiment of the present invention relates to a secondary battery and in particular to a lithium ion secondary battery.

BACKGROUND ART

With the rapidly expansion of the market for laptop computers, mobile phones, electric vehicles, and the like, a secondary battery having a high energy density is required. Examples of a method for obtaining a secondary battery having a high energy density include a method in which a negative electrode material having a large capacity is used, and a method in which an nonaqueous electrolyte liquid having an excellent stability is used.

Patent Document 1 discloses using a silicon oxide or a silicate as a negative electrode active substance of a secondary battery. Patent Document 2 discloses a negative electrode for a secondary battery which has an active substance layer containing a carbon material particle that can absorb and desorb lithium ion, a metal particle that can be alloyed with lithium, and an oxide particle that can absorb and desorb lithium ion. Patent Document 3 discloses a negative electrode material for a secondary battery which is formed by coating the surface of a particle, which has a structure in which a silicon fine crystal is dispersed in a silicon compound, with carbon.

Also, the use of electrolyte liquid containing ionic liquid has been suggested in terms of imparting flame retardancy, as disclosed in Patent Documents 4 to 6.

CITED REFERENCE

Patent Document

Patent Document 1: JP 6-325765 A
Patent Document 2: JP 2003-123740 A
Patent Document 3: JP 2004-47404 A
Patent Document 4: JP 2009-199960 A
Patent Document 5: JP 2008-257963 A
Patent Document 6: JP 2009-259723 A

SUMMARY OF THE INVENTION

Problems to be Solved by the Invention

However, when charging and discharging are carried out at 45° C. or higher in the case where the silicon oxide disclosed in Patent document 1 is used as a negative electrode active substance, there has been a problem in which capacity deterioration associated with the charge/discharge cycle may become significantly large.

The negative electrode for a secondary battery disclosed in Patent document 2 has an effect in which the volume change of the negative electrode as a whole is relaxed due to the different charge/discharge electric potential of three kinds of components when lithium is absorbed and desorbed. However, in Patent document 2, there have been some points which have not been sufficiently studied, regarding a relationship among three kinds of components in a state of coexistence, and regarding the binder, an electrolyte liquid, a conformation of an electrode assembly, and a package which are indispensable for fabricating a lithium ion secondary battery.

The negative electrode material for a secondary battery disclosed in Patent document 3 also has an effect in which the volume change of the negative electrode as a whole is relaxed. However, in Patent document 3, there have been some points which have not been sufficiently studied, regarding a binder, an electrolyte liquid, a conformation of an electrode assembly, and a package which are indispensable for fabricating a lithium ion secondary battery.

Further, secondary batteries disclosed in Patent Documents 4 to 6 have good flame retardancy, but ionic liquids are decomposed due to repeated charge/discharge cycles and consequently cycle property may be reduced.

Thus, it is an object of the present invention to provide a secondary battery having both of good flame retardancy and good cycle property even when using an electrolyte liquid comprising ionic liquid.

Means of Solving the Problem

An exemplary embodiment of the present invention is a secondary battery, comprising a negative electrode and a battery electrolyte liquid comprising a supporting salt and a non-aqueous electrolyte solvent;

wherein the negative electrode is obtained by pre-forming a SEI coating film on a negative electrode structure which is formed by binding a negative electrode active substance comprising a metal (a) that can be alloyed with lithium, a metal oxide (b) that can absorb and desorb lithium ion and a carbon material (c) that can absorb and desorb lithium ion, to a negative electrode current collector with a negative electrode binder, and wherein the non-aqueous electrolyte solvent contains at least an ionic liquid.

Also, an exemplary embodiment of the present invention is a method for manufacturing a secondary battery including a negative electrode and a battery electrolyte liquid comprising a supporting salt and a non-aqueous electrolyte solvent, the method comprising:

forming a negative electrode structure by binding a negative electrode active substance comprising a metal (a) that can be alloyed with lithium, a metal oxide (b) that can absorb and desorb lithium ion and a carbon material (c) that can absorb and desorb lithium ion, to a negative electrode current collector with a negative electrode binder, forming a SEI coating film on the negative electrode structure by an electrode reaction with a coating film-forming electrolyte liquid comprising a carbonate compound to obtain the negative electrode, and assembling the secondary battery using the negative electrode having the SEI coating film formed and the battery electrolyte liquid, and wherein the non-aqueous electrolyte solvent of the battery electrolyte liquid contains at least an ionic liquid.

Effect of the Invention

According to the exemplary embodiment of the present invention, a high performance secondary battery having both of good flame retardancy and good cycle property can be provided.

DESCRIPTION OF EMBODIMENTS

Hereinafter, an exemplary embodiment of the present invention will be described in detail.

In the secondary battery according to the exemplary embodiment, an electrode assembly in which a positive electrode and a negative electrode are arranged to face each other and a battery electrolyte liquid are accommodated in a package. A shape of the secondary battery may be any type selected from among a cylindrical type, a flat wound rectangular type, a stacked rectangular type, a coin type, a flat wound laminate type and a stacked laminate type, but is preferably a stacked laminate type. Hereinafter, a secondary battery of a stacked laminate type will be described.

Figure 1:
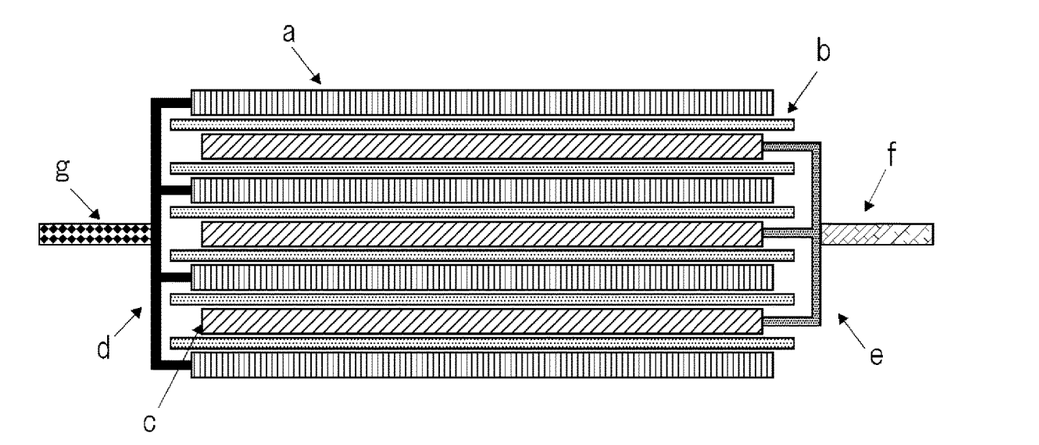
FIG. 1 is a schematic cross-sectional view showing a conformation of an electrode assembly of a stacked laminate type secondary battery.

FIG. 1 is a schematic cross-sectional view showing a structure of an electrode assembly of a secondary battery of a stacked laminate type. The electrode assembly has a planar stacked structure in which a positive electrode and a negative electrode are arranged to face each other, and the electrode assembly shown in FIG. 1 is formed by alternately stacking a plurality of positive electrodes c and a plurality of negative electrodes a with a separator b being interposed therebetween. Respective positive electrode current collectors e which the positive electrodes c have are mutually welded on the end of the each current collector which is not covered with a positive electrode active substance, to be thereby electrically connected, and further a positive electrode terminal f is welded to the welded portion. Respective negative electrode current collectors d which the negative electrodes a have are mutually welded on the end of the each current collector which is not covered with a negative electrode active substance, to be thereby electrically connected, and further a negative electrode terminal g is welded to the welded portion.

Since an electrode assembly having such a planar stacked structure has no portion of a small R (a region near a winding core of a wound structure), an advantage of the electrode assembly is that it is less adversely affected by volume change of the electrode that occurs in the charge/discharge cycle than an electrode assembly having a wound structure. Therefore, the electrode assembly is useful when using an active substance in which a volume expansion is liable to occur.

[1] Negative Electrode

The negative electrode is obtained by pre-forming a SEI coating film on a negative electrode structure, wherein the negative electrode structure is formed by binding a negative electrode active substance comprising a metal (a) that can be alloyed with lithium, a metal oxide (b) that can absorb and desorb lithium ion and a carbon material (c) that can absorb and desorb lithium ion, to a negative electrode current collector with a negative electrode binder. By using a negative electrode having a SEI coating film thus pre-formed, a secondary battery of the present exemplary embodiment can have excellent cycle property even when a battery electrolyte liquid containing an ionic liquid is used. Thus, by using a negative electrode having a pre-formed SEI coating film in manufacturing a secondary battery, an ionic liquid may be prevented from being decomposed during an initial charge/discharge, and consequently a reduction in cycle property may be prevented.

The negative electrode active substance comprises (a) a metal capable of forming an alloy with lithium, (b) a metal oxide capable of absorbing and emitting lithium ions and (c) a carbon material capable of absorbing and emitting lithium ions.

As metal (a), Al, Si, Pb, Sn, In, Bi, Ag, Ba, Ca, Hg, Pd, Pt, Te, Zn, La or an alloy of two or more kinds of the elements thereof can be used. In particular, it is preferable to contain silicon (Si) as metal (a).

As metal oxide (b), silicon oxide, aluminum oxide, tin oxide, indium oxide, zinc oxide, lithium oxide or a complex thereof can be used. In particular, it is preferable to contain silicon oxide as metal oxide (b). This is because silicon oxide is relatively stable and is hard to cause a reaction with another chemical compound. Also, one element or two or more elements selected from among nitrogen, boron and sulfur can be added as metal oxide (b), for example, in the amount of 0.1 to 5 mass %. By this, the electroconductivity of metal oxide (b) can be improved.

As carbon material (c), graphite, amorphous carbon, diamond-like carbon, carbon nanotube or a complex thereof can be used. Here, graphite having high crystallinity has high electroconductivity and excellent adhesiveness with a positive electrode collector consisting of metal such as copper or the like as well as excellent voltage flatness. On the other hand, since amorphous carbon having low crystallinity has relatively low volume expansion, there is a significant effect of relaxing the volume expansion of the entire negative electrode, and deterioration due to ununiformity such as a crystal grain boundary or a defect hardly occurs.

As for metal oxide (b), all or a part thereof preferably has an amorphous structure. Metal oxide (b) having an amorphous structure can suppress the volume expansion of carbon material (c) or metal (a) and can also suppress decomposition of a battery electrolyte liquid. This mechanism is not obvious, but the amorphous structure of metal oxide (b) is assumed to have some influences on a coating formation at the interface between carbon material (c) and the battery electrolyte liquid. Also, it is assumed that the amorphous structure has a relatively small constituent due to ununiformity such as a crystal grain boundary or a defect. Note that, it can be confirmed by X-ray diffraction measurement (general XRD measurement) that all or a part of metal oxide (b) has an amorphous structure. Specifically, in the case where metal oxide (b) does not have an amorphous structure, a peak peculiar to metal oxide (b) is observed, while in the case where all or a part of metal oxide (b) has an amorphous structure, a observed peak peculiar to metal oxide (b) becomes to be broad.

Metal oxide (b) is preferably an oxide of metal which constitutes metal (a). Also, metal (a) and metal oxide (b) are preferably silicon (Si) and silicon oxide (SiO), respectively. Hereinafter, a negative electrode active substance in which silicon and silicon oxide each are used as metal (a) and metal oxide (b), respectively, are also abbreviated as Si/SiO/C-based active substance.

As for metal (a), all or a part thereof is dispersed in metal oxide (b). The dispersion of at least a part of metal (a) in metal oxide (b) can suppress the volume expansion of the negative electrode as a whole and can also suppress decomposition of a battery electrolyte liquid. Note that, it can be confirmed by transmission electron microscope observation (general TEM observation) and along with energy dispersive X-ray spectroscopy measurement (general EDX measurement) that all or a part of metal (a) is dispersed in metal oxide (b). Specifically, a section of a specimen of metal particle (a) is observed and oxygen atom concentration of metal particle (a) which is dispersing in metal oxide (b) is measured, and thereby it can be confirmed that a metal which constitutes metal particle (a) does not become an oxide.

A negative electrode active substance, in which all or a part of metal oxide (b) has an amorphous structure and in which all or a part of metal (a) is dispersed in metal oxide (b), can be produced, for example, by the method disclosed in Patent document 3. That is, CVD processing of metal oxide (b) is carried out under an atmosphere containing organic substance gas such as methane gas, to obtain a complex in which metal (a) in metal oxide (b) is a nano-cluster and in which the surface is covered with carbon material (c). Also, the above-mentioned negative electrode active substance is also produced by mixing carbon material (c), metal (a) and metal oxide (b) by mechanical milling.

As mentioned above, the content of metal (a), the content of metal oxide (b) and the content of carbon material (c) with respect to the total of metal (a), metal oxide (b) and carbon material (c) are preferably 5 mass % more and 90 mass % or less, 5 mass % more and 90 mass % or less, and 2 mass % more and 80 mass % or less, respectively. Also, the content of metal (a), the content of metal oxide (b) and the content of carbon material (c) with respect to the total of metal (a), metal oxide (b) and carbon material (c) are more preferably 20 mass % more and 50 mass % or less, 40 mass % more and 70 mass % or less, and 2 mass % more and 30 mass % or less, respectively.

Also, each of metal (a), metal oxide (b) and carbon material (c) that is used can be, but should not particularly be limited to, a particle thereof. For example, the average particle diameter of metal (a) can be constituted in a range smaller than the average particle diameter of carbon material (c) and the average particle diameter of metal oxide (b). By this constitution, since metal (a) in which the volume change associated with charge and discharge is small has a relatively small particle diameter, and since carbon material (c) and metal oxide (b) in which the volume change is large has a relatively large particle diameter, dendrite generation and the pulverization of alloy are more effectively suppressed. Also, in the process of charge and discharge, lithium is absorbed and desorbed from the larger diameter particle, the smaller diameter particle and the larger diameter particle in this order. From this point, the residual stress and the residual strain are suppressed. The average particle diameter of metal (a) can be, for example, 20 µm or less, and is preferably 15 µm or less.

Also, it is preferable that the average particle diameter of metal oxide (b) be a half or less of the average particle diameter of carbon material (c), and it is preferable that the average particle diameter of metal (a) be a half or less of the average particle diameter of metal oxide (b). Further, it is more preferable that the average particle diameter of metal oxide (b) be a half or less of the average particle diameter of carbon material (c) as well as that the average particle diameter of metal (a) be a half or less of the average particle diameter of metal oxide (b). Controlling of the average particle diameter in this range can more advantageously give the effect of relaxing effect of the volume expansion of the metal and alloy phase, and can provide a secondary battery having an excellent balance of an energy density, a cycle life and an efficiency. More specifically, it is preferable that the average particle diameter of silicon oxide (b) be a half or less of the average particle diameter of graphite (c) and that the average particle diameter of silicon (a) be a half or less of the average particle diameter of silicon oxide (b). Also, more specifically, the average particle diameter of silicon (a) can be, for example, 20 µm or less, and is preferably 15 µm or less.

The negative electrode binder that can be use includes, but should not be particularly limited to, for example, a polyvinylidene fluoride (PVdF), a vinylidene fluoride-hexafluoropropylene copolymer, a vinylidene fluoride-tetrafluoroethylene copolymer, a styrene-butadiene copolymerized rubber, a polytetrafluoroethylene, a polypropylene, a polyethylene, a polyimide (PI), a polyamide-imide (PAI) or the like. Among these, a polyimide (PI) and a polyamideimide (PAI) are preferable. By using a polyimide or a polyamideimide as the negative electrode binder, adhesion between a negative electrode active substance and a current collector is improved. Therefore, since an electrical contact between the negative electrode active substance and the collector is better maintained during the repeated charge/discharge, it is possible to obtain good cycle property.

A content of the negative electrode binder is preferably in the range of 1 to 30 mass % with respect to the total of the negative electrode active substance and the negative electrode binder, and is more preferably in the range of 2 to 25 mass %. When it is 1 mass % or more, the adhesiveness of the active substances or of the active substance to the collector is improved and the cycle property becomes good. Also, when it is 30 mass % or less, the ratio of the active substance proportion is improved and the negative electrode capacity can be improved.

A negative electrode collector is not particularly limited, but aluminum, nickel, copper, silver and alloying thereof are preferable from the electrochemical stability. Examples of the shape thereof include foil, flat plate and mesh.

For example, the negative electrode structure may be fabricated by forming a negative electrode active substance layer which comprises a negative electrode active substance and a negative electrode binder on a negative electrode current collector. As a method for forming the negative electrode active substance layer, without a particular limitation, a die coater method, a CVD method, a sputtering method and the like may be used. Moreover, the negative electrode structure may be fabricated by forming the negative electrode active substance layer followed by forming the negative electrode current collector with a thin film of aluminum, nickel or any alloy thereof using methods such as vapor deposition and sputtering.

A SEI (Solid Electrolyte Interface) coating film exhibits lithium ion conductivity but does not exhibit electron conductivity. A method for forming the SEI coating film is not particularly limited, but an electrochemical method, a method of causing short-circuit with lithium metal or a method of depositing on a surface of an electrode may be included. For example, the SEI coating film may be formed by an electrode reaction with a coating film-forming electrolyte liquid which comprises a supporting salt and a non-aqueous electrolyte solvent.

The supporting salt is preferably, but should not be particularly limited to, lithium salts. Examples of lithium salts may include $LiPF_6$, $LiAsF_6$, $LiAlCl_4$, $LiClO_4$, $LiBF_4$, $LiSbF_6$, $LiCF_3SO_3$, $LiC_4F_9SO_3$, $LiN(CF_3SO_2)(C_2F_5SO_2)$, $LiN(CF_3SO_2)_2$, $LiN(C_2F_5SO_2)_2$ and the like. Among these, LiPF$_6$ is preferable. The supporting salt may be used alone or in any combination of two or more kinds.

The non-aqueous electrolyte solvent in the coating film-forming electrolyte liquid should not be particularly limited. Examples may include aprotic organic solvents such as: cyclic-type carbonate compounds such as propylene carbonate (PC), ethylene carbonate (EC), butylene carbonate (BC), vinylene carbonate (VC), and vinylethylene carbonate (VEC); linear-type carbonate compounds such as dimethyl carbonate (DMC), diethyl carbonate (DEC), ethyl methyl carbonate (EMC), and dipropyl carbonate (DPC); carbonate compounds such as propylene carbonate derivatives; and aliphatic carboxylates such as methyl formate, methyl acetate, and ethyl propionate; and the like. Also, propanesultone (PS), butanesultone (BS) or the like may be used. In addition, ethers such as diethylether or dimethylether or fluorinated ethers in which hydrogen atoms in said ethers are partially or entirely substituted with fluorine atom may be used. These non-aqueous electrolyte solvent may be used alone or in any combination of two or more kinds.

Further, when forming a SEI coating film, it is preferable to use a carbonate compound as the non-aqueous electrolyte solvent. By using such a carbonate compound, a SEI coating film having good conductivity and durability may be formed. For example, a cell is fabricated wherein the cell comprises a negative electrode structure, a potive electrode served as a counter electrode of the negative electrode structure and a coating film-forming electrolyte liquid which contains a supporting salt and a carbonate compound, and a SEI coating film may be formed by performing repeatedly charge/discharge. As the potive electrode, which should not be particularly limited to, known potive electrodes including Li may be used, and for example lithium metal may be used.

Note that, in the present specification, a carbonate compound represent a compound other than fluorinated carbonate compounds, and may be also referred to as a non-fluorinated carbonate compound. Examples of the non-fluorinated carbonate compound may include cyclic-type or linear-type as mentioned above.

By using a non-fluorinated carbonate compound as the non-aqueous electrolyte solvent of the coating film-forming electrolyte liquid, the ion dissociation of the electrolyte liquid is improved and also the viscosity of the electrolyte liquid is decreased. As a result, the mobility of ions may be increased.

Moreover, preferably the non-aqueous electrolyte solvent used in forming a SEI coating film may comprise additionally a fluorinated carbonate compound in addition to a non-fluorinated carbonate compound. By adding a fluorinated carbonate compound to the non-aqueous electrolyte solvent of the coating film-forming electrolyte liquid, a SEI coating film having better cycle property may be formed.

The fluorinated carbonate compound includes cyclic-type and linear-type, and specifically includes a fluorinated cyclic-type carbonate compound and a fluorinated linear-type carbonate compound. A fluorinated cyclic-type carbonate compound is preferable.

The fluorinated cyclic-type carbonate compound that can be used includes, but should not be particularly limited to, for example, compounds such as ethylene carbonate, propylene carbonate, vinylene carbonate and vinylethylene carbonate which are partially fluorinated may be used. Specifically, for example, 4-fluoro-1,3-dioxolane-2-on (fluoroethylene carbonate, hereinafter, it is also abbreviated as FEC), (cis or trans) 4,5-difluoro-1,3-dioxolane-2-on, 4,4-difluoro-1,3-dioxolane-2-on, 4-fluoro-5-methyl-1,3-dioxolane-2-on and the like. Among these, fluoroethylene carbonate is preferable.

The fluorinated linear-type carbonate compound that can be used includes, but should not be particularly limited to, for example, compounds such as dimethyl carbonate, diethyl carbonate, ethylmethyl carbonate, dipropyl carbonate and methyl-propyl carbonate whose hydrogen atoms are partially or entirely substituted with fluorine atom. Specifically, for example, bis(fluoroethyl)carbonate, 3-fluoropropylmethyl carbonate, 3,3,3-trifluoropropylmethyl carbonate, and the like can be used.

For example, a content of the fluorinated carbonate in the non-aqueous electrolyte solvent of the coating film-forming electrolyte liquid is preferably in the range of 0.1 to 10 mass %, more preferably in the range of 0.2 to 8 mass %, and even more preferably in the range of 1 to 5 mass %.

[2] Potive Electrode

A positive electrode is formed, for example, by binding a positive electrode active substance on a positive electrode collector with a positive electrode binder so that the positive electrode active substance covers the positive electrode collector.

Examples of the positive electrode active substance include lithium manganates having a lamellar structure or lithium manganates having a Spinel structure including LiMnO$_2$ and Li$_x$Mn$_2$O$_4$ (0<x<2); LiCoO$_2$, LiNiO$_2$ and materials in which a part of transition metal thereof are substituted with another metal; lithium transition metal oxides such as LiNi$_{1/3}$Co$_{1/3}$Mn$_{1/3}$O$_2$ in which the molar ratio of a particular transition metal is not more than one half; and materials which have lithium at a larger amount than the stoichiometric amount in these lithium transition metal oxides. In particular, Li$_\alpha$Ni$_\beta$Co$_\gamma$Al$_\delta$O$_2$ (1≤+≤1.2, β+γ+δ=1, δ≥0.7, and γ≤0.2) or Li$_\alpha$Ni$_\beta$Co$_\gamma$Mn$_\delta$O$_2$ (1≤α1.2, β+γ+δ=1, β≥0.6, and γ≤0.2) is preferable. The positive electrode active substance can be used alone, or in combination with two or more kinds.

As a positive electrode binder, the same materials for a negative electrode binder can be used. Among these, from the standpoint of versatility and low cost, polyvinylidene fluorides are preferable. The content of the positive electrode binder is preferably 1 to 20 mass % with respect to the total amount of the positive electrode active substance and the positive electrode binder, and is more preferably 2 to 10 mass %, from the standpoint of "sufficient binding force" and "high energy" which are trade-off to each other.

As a positive electrode collector, the same materials for a negative electrode collector can be used.

For the purpose of reducing the impedance, an electroconductive auxiliary material may be added to a positive electrode active substance layer containing a positive electrode active substance. Examples of the electroconductive auxiliary material include carbonaceous fine particles such as graphite, carbon black, and acetylene black.

[3] Battery Electrolyte Liquid

The battery electrolyte liquid used in an exemplary embodiment of the present invention comprises a supporting salt and a non-aqueous electrolyte solvent, and the non-aqueous electrolyte solvent contains at least an ionic liquid.

The ionic liquid is a salt which comprises cation and anion and which is present at a liquid state at a temperature between −10° C. and 100° C. The ionic liquid used should not be particularly limited.

Examples of anion comprised in the ionic liquid may include (CF$_3$SO$_2$)$_2$N$^-$ (abbreviated as TFSI), (C$_2$F$_5$SO$_2$)$_2$N$^-$ (abbreviated as BETI), (FSO$_2$)$_2$N$^-$ (abbreviated as FSI), $(C_4F_9SO_2)_2N^-$, $(CF_3SO_2)_3C^-$, $(C_2F_5SO_2)_3C^-$, $BF_4^-$, $AlF_4^-$, $PF_6^-$, $AsF_6^-$, $SbF_6^-$, $ClO_4^-$, $AlCl_4^-$, $CF_3SO_3^-$, $C_2F_5SO_3^-$, $C_3F_7SO_3^-$, $C_4F_9SO_3^-$, $CH_3SO_3^-$, $C_2H_5SO_3^-$, $CH_3OSO_3^-$, $C_2H_5OSO_3^-$, $(CF_3)_3PF_3^-$, $(C_2F_5)_3PF_3^-$, $(C_3F_7)_3PF_3^-$, $(C_4F_9)_3PF_3^-$ or the like. Also, cyclic-type anion such as $(CF_2SO_2)_2N^-$ (abbreviated as C-TFSI) or $(CF_2)_3(SO_2)_2N^-$ may be used. Among these, imide anions such as TFSI, BETI, FSI or $(C_4F_9SO_2)_2N^-$ is preferably used as anion in the ionic liquid, and TFSI or BETI is more preferable.

Examples of cation comprised in the ionic liquid may include imidazolium, ammonium, pyridinium, pyrrolidinium, piperidinium, phosphonium, sulfonium or the like. Examples of imidazolium may include 1-ethyl-3-methyl imidazolium (EMI), 1-methyl-3-octyl imidazolium (MOI), 1,3-dimethyl imidazolium, 1,3-diethyl imidazolium, 1-propyl-3-methyl imidazolium, 1-butyl-3-methyl imidazolium, 1-hexyl-3-methyl imidazolium, 1-ethyl-2,3-dimethyl imidazolium or the like. Examples of ammonium may include tetrabutyl ammonium, tetraethyl ammonium, triethylmethyl ammonium, N,N-dimethyl-N-methyl-N-(2-methoxyethyl) ammonium (DEME), trimethylhexyl ammonium (TMHA), N,N,N-trimethyl-N-propyl ammonium or the like. Examples of pyridinium may include 1-butyl-3-methylpyridinium, 1-butyl pyridinium or the like. Examples of pyrrolidinium may include 1-butyl-1-methylpyrrolidinium (BMP), N-methyl-N-propyl pyrrolidinium (P13) or the like. Examples of piperidinium may include 1-ethyl-1-methyl piperidinium, N-methyl-N-propyl piperidinium (PP13) or the like. Examples of phosphonium may include triethylmethoxyethyl phosphonium (TEMEP), triethylmethyl phosphonium, triethylhexyl phosphonium or the like. Examples of sulfonium may include triethyl sulfonium (TES), triethylmethyl sulfonium, triethylhexyl sulfonium or the like.

Further, these anions and cations may be used alone or in any combination of two or more kinds.

Among the ionic liquid mentioned above, BMP-TFSI, EMI-TFSI, TEMEP-TFSI or TES-TFSI is preferable, and BMP-TFSI or EMI-TFSI is more preferable.

A content of the ionic liquid in the non-aqueous electrolyte solvent should not be particularly limited, but, for example, in the viewpoint of flame retardancy, the content may be 10 mass % or more, preferably 20 mass % or more, more preferably 30 mass % or more, and even more preferably 40 mass % or more. Also, the content of the ionic liquid in the non-aqueous electrolyte solvent may be 100 mass %, but for example the content may be 99.9 mass % or less, 90 mass % or less, 80 mass % or less, and 70 mass % or less. In this exemplary embodiment of the present invention, even if the content of the ionic liquid is high such as 20 mass % or more, since a negative electrode having a SEI coating film pre-formed is used, the decomposition of the ionic liquid may be inhibited during an initial charge/discharge, and good cycle property can be achieved. Consequently, a secondary battery having both of good cycle property and good flame retardancy may be obtained.

The non-aqueous electrolyte solvent in the battery electrolyte liquid may comprise a non-fluorinated carbonate compound in addition to an ionic liquid. The non-fluorinated carbonate compound may be a cyclic-type or linear-type, as mentioned above. Examples of the non-fluorinated cyclic-type carbonate compound may include propylene carbonate (PC), ethylene carbonate (EC), butylene carbonate (BC), vinylene carbonate (VC), vinylethylene carbonate (VEC) and the like. Examples of the non-fluorinated linear-type carbonate compound may include dimethyl carbonate (DMC), diethyl carbonate (DEC), ethylmethyl carbonate (EMC), dipropyl carbonate (DPC) and the like. Further, a non-fluorinated carbonate compound may include propyl carbonate derivatives as mentioned above.

When the non-aqueous electrolyte solvent in the battery electrolyte liquid comprises a non-fluorinated carbonate compound, a content of the non-fluorinated carbonate compound in the non-aqueous electrolyte solvent is preferably in the range of 10 to 90 mass %, and more preferably the range of 20 to 80 mass %. By using the non-fluorinated carbonate compound, the ion dissociation and ion mobility of the battery electrolyte liquid may be improved.

In addition, the non-aqueous electrolyte solvent in the battery electrolyte liquid may preferably comprise a fluorinated carbonate compound. By adding a fluorinated carbonate compound to the electrolyte solvent of the battery electrolyte liquid, cycle property can be more improved. Examples of the fluorinated carbonate compound may include those as mentioned above, but preferably a fluorinated cyclic-type carbonate may be used, and FEC is more preferable.

When the non-aqueous electrolyte solvent in the battery electrolyte liquid comprises a fluorinated carbonate compound, a content of the fluorinated carbonate compound in the non-aqueous electrolyte solvent is preferably in the range of 0.1 to 10 mass %, more preferably the range of 0.2 to 8 mass % and even more preferably the range of 1 to 5 mass %.

Further, the non-aqueous electrolyte solvent in the battery electrolyte liquid may preferably comprise a non-fluorinated carbonate compound and a fluorinated carbonate compound in addition to an ionic liquid. In this case, particularly a content of the ionic liquid in the non-aqueous electrolyte solvent is preferably 20 to 89.9 mass %, more preferably 30 to 79.8 mass % and even more preferably 40 to 69 mass %. A content of the non-fluorinated carbonate compound in the non-aqueous electrolyte solvent is preferably in the range of 10 to 79.9 mass %, more preferably the range of 20 to 69.8 mass % and even more preferably the range of 30 to 59 mass %. A content of the fluorinated carbonate compound in the non-aqueous electrolyte solvent is preferably in the range of 0.1 to 10 mass %, more preferably the range of 0.2 to 8 mass % and even more preferably the range of 1 to 5 mass %.

The battery electrolyte liquid may further comprise a supporting salt. The supporting salt is, but should not be particularly limited to, preferably lithium salts may be used. Examples of lithium salts may include $LiPF_6$, $LiAsF_6$, $LiAlCl_4$, $LiClO_4$, $LiBF_4$, $LiSbF_6$, $LiCF_3SO_3$, $LiC_4F_9SO_3$, $LiN(CF_3SO_2)(C_2F_5SO_2)$, $LiN(FSO_2)_2$, $LiN(CF_3SO_2)_2$, $LiN(C_2F_5SO_2)_2$ and the like. Also, cyclic lithium salts such as $LiN(CF_2SO_2)_2$ (abbreviated as Li-CTFSI) and $LiN(CF_2)_3(SO_2)_2$ may be used. Among others, $LiN(CF_3SO_2)_2$ (abbreviated as LiTFSI) and $LiN(C_2F_5SO_2)_2$ (abbreviated as LiBETI) may preferably be used. These supporting salts may be used alone or in any combination of two or more kinds.

In the exemplary embodiment of the present invention, a concentration of the lithium salt in the electrolyte liquid of the battery electrolyte is, for example in the range of 0.6-3M, and preferably the range of 0.8-1.2M.

[4] Separator

As a separator, a porous film or a nonwoven cloth of polypropylene, polyethylene or the like can be used. A separator in which these are stacked can also be used.

[5] Package

A package is arbitrarily selected as long as it is stable against a battery electrolyte liquid and it has a sufficient water vapor barrier property. For example, in the case of a stacked laminate type secondary battery, a lamination film of polypropylene, polyethylene or the like which is coated with aluminum or silica is preferably used as a package. In particular, it is preferable to use an aluminum lamination film from the standpoint of suppressing the volume expansion.

[6] Method of Manufacturing a Secondary Battery

A secondary battery according to an exemplary embodiment of the present invention may be manufactured by assembling a secondary battery using a negative electrode having a SEI coating film formed on a negative electrode structure by an electrode reaction and a battery electrolyte liquid. The SEI coating film may be formed by an electrode reaction with a coating film-forming electrolyte liquid comprising a carbonate compound as mentioned above.

A method of manufacturing a secondary battery will be specifically described below. First, a cell is fabricated wherein the cell comprises a negative electrode structure, a separator, a lithium metal served as a counter electrode of the negative electrode structure and a coating film-forming electrolyte liquid comprising a carbonate compound, the separator being interposed between the negative electrode structure and the counter electrode. Then, a SEI coating film is electrochemically formed on a surface of the negative electrode structure by performing a repeated charge/discharge in the cell, thereby to manufacture a negative electrode. Then, the obtained negative electrode is removed from the cell, and a secondary battery is fabricated using this negative electrode and a battery electrolyte liquid as mentioned above.

EXAMPLES

Now, the present invention will be described in detail with reference to Examples.

Example 1

A silicon having an average particle diameter of 5 μm as metal (a), an amorphous silicon oxide ($SiO_x$, $0<x\leq2$) having an average particle diameter of 13 μm as metal oxide (b), and a graphite having an average particle diameter of 30 μm as carbon material (c) were weighed at a mass ratio of 30:55:15. Then, these materials were mixed by so-called mechanical milling for 24 hours to obtain a negative electrode active substance. Note that, in this negative electrode active substance, the silicon that is metal (a) was dispersed in the silicon oxide ($SiO_x$, $0<x\leq2$) that is metal oxide (b).

The above-mentioned negative electrode active substance (average particle diameter $D_{50}$=5 μm) and a polyimide (produced by UBE INDUSTRIES, trade name: U varnish A) as a negative electrode binder were weighed at a mass ratio of 85:15 and were mixed with n-methylpyrrolidone to prepare a negative electrode slurry. The negative electrode slurry was applied to a copper foil having a thickness of 10 μm and was then dried, and it was further heat-treated under nitrogen atmosphere at 300° C. to produce a negative electrode. Note that, in TABLE 1, the content (%) of the negative electrode binder represents the content (mass %) of the negative electrode binder in the negative electrode active substance and the negative electrode binder.

Then, a cell was fabricated wherein the cell is composed of the obtained negative electrode structure, a separator, a lithium metal served as a counter electrode of the negative electrode structure and a coating film-forming electrolyte liquid comprising a carbonate compound, the separator being interposed between the negative electrode structure and the counter electrode. Then, a SEI coating film was electrochemically formed on a surface of the negative electrode structure by performing repeatedly 10 cycles of charge and discharge in this order on the cell at the rate of 1/10 C. As a non-aqueous electrolyte solvent for forming the coating film, a mixture solution obtained by mixing ethylene carbonate (EC) and diethyl carbonate (DEC) at a volume ratio of 30:70 was used. As a supporting salt, lithium hexafluorophosphate (abbreviated as $LiPF_6$:molecular weight 151.9) was used. A concentration of the supporting salt in the coating film-forming electrolyte liquid was set to 1 mol/L (1M). A cutoff potential was set to 0.1V in discharging and 1.3V in charging. After $10^{th}$ charge, the cell was disassembled to obtain a negative electrode.

Lithium nickelate ($LiNi_{0.80}Co_{0.15}Al_{0.15}O_2$) as a positive electrode active substance, carbon black as an electroconductive auxiliary material, and polyvinylidene fluoride as a positive electrode binder were weighed at a mass ratio of 90:5:5. Then, they were mixed with n-methylpyrrolidone to prepare a positive electrode slurry. The positive electrode slurry was applied to an aluminum foil having a thickness of 20 μm and then dried, and it was further pressed to produce a negative electrode.

Three layers of the positive electrode that was obtained and four layers of the negative electrode that was obtained were alternately stacked with a polypropylene porous film as a separator placed therebetween. End parts of the positive electrode collectors which were not covered with the positive electrode active substance and end parts of the negative electrodes collectors which were not covered with the negative electrode active substance were respectively welded. Further, an aluminum positive electrode terminal and a nickel negative electrode terminal were respectively welded thereto, to obtain an electrode assembly which had a planar stacking conformation.

Also, an ionic liquid and a non-fluorinated carbonate compound were mixed in a ratio of 20 parts by mass and 80 parts by mass, respectively, to prepare a non-aqueous electrolyte solvent of a battery electrolyte liquid. EMI-TFSI was used as the ionic liquid and the mixture solvent of EC/DEC=20/80 (volume ratio) was used as the non-fluorinated carbonate compound. Then, as a supporting salt, LiTFSI was dissolved in the non-aqueous electrolyte solvent of the battery electrolyte liquid at a concentration of 0.8 M (mole/L) to prepare the battery electrolyte liquid. In Table 1, the content (%) represents a content (mass %) in the non-aqueous electrolyte solvent.

The above-mentioned electrode assembly was enclosed in an aluminum lamination film as a package and the battery electrolyte liquid was poured thereinto, and it was then depressurized to 0.1 atm and was sealed to produce a secondary battery.

Evaluation (40° C. Cycle)

A test of repeating charge/discharge 10 times in the voltage range from 2.5 V to 4.2 V in a constant-temperature bath held at 40° C. was carried out on the fabricated secondary battery to thereby evaluate the maintenance rate (%). The results are shown in Table 2. In Table 2, "maintenance rate (%)" represents (discharge capacity at 10th cycle)/(discharge capacity at the 2nd cycle)×100 (unit: %).

(Flame Retardancy Test)

A filter paper of glass fiber having width of 3 mm, length of 30 mm and thickness of 0.7 mm was wetted with 50 μL of the electrolyte liquid. An end of the filter paper was picked with tweezers and the other end was made to pass through gas burner flame of 2 cm height. After passing the glass fiber filter paper through flame for a moment and moving it away from the flame, the presence of flame in the paper was visually confirmed. Case that flame was observed in the glass fiber was determined as 'flammable', and case that flame was not observed in the glass fiber was determined as 'non-flammable'. The results are shown in Table 2.

Example 2

A secondary battery was fabricated in the same manner as Example 1, except for using a non-aqueous electrolyte solvent for a battery electrolyte liquid which was prepared by mixing the ionic liquid and the non-fluorinated carbonate compound in the ratio of 40 parts by mass and 60 parts by mass, respectively. The results of evaluating the secondary battery are shown in Table 2.

Example 3

A secondary battery was fabricated in the same manner as Example 2, except for using a negative electrode in which a SEI coating film was formed with a non-aqueous electrolyte solvent in the coating film-forming electrolyte liquid which is prepared by adding FEC in the mixture solvent of EC and DEC (volume ratio 30:70) at the concentration of 2 mass %. The results of evaluating the secondary battery are shown in Table 2.

Example 4

A secondary battery was fabricated in the same manner as Example 2, except for using a non-aqueous electrolyte solvent for a battery electrolyte liquid which was prepared by mixing the ionic liquid, the non-fluorinated carbonate compound and FEC in the ratio of 40 parts by mass, 58 parts by mass and 2 parts by mass. The results of evaluating the secondary battery are shown in Table 2.

Example 5

A secondary battery was fabricated in the same manner as Example 2, except for using a negative electrode in which a SEI coating film was formed with a non-aqueous electrolyte solvent in the coating film-forming electrolyte liquid which is prepared by adding FEC in the mixture solvent of EC and DEC (volume ratio 30:70) at the concentration of 2 mass %, and except for using a non-aqueous electrolyte solvent for a battery electrolyte liquid which was prepared by mixing the ionic liquid, the non-fluorinated carbonate compound and FEC in the ratio of 40 parts by mass, 58 parts by mass and 2 parts by mass. The results of evaluating the secondary battery are shown in Table 2.

Example 6

A secondary battery was fabricated using the same method as Example 1, except for using a negative electrode in which a SEI coating film was formed with a non-aqueous electrolyte solvent in the coating film-forming electrolyte liquid which is prepared by adding FEC in the mixture solvent of EC and DEC (volume ratio 30:70) at the concentration of 2 mass %, and except for using a non-aqueous electrolyte solvent for a battery electrolyte liquid which was prepared by mixing the ionic liquid and the non-fluorinated carbonate compound in the ratio of 40 parts by mass and 60 parts by mass. The results of evaluating the secondary battery are shown in Table 2.

Example 7

A secondary battery was fabricated using the same method as Example 1, except for using a negative electrode in which a SEI coating film was formed with a non-aqueous electrolyte solvent in the coating film-forming electrolyte liquid which is prepared by adding FEC in the mixture solvent of EC and DEC (volume ratio 30:70) at the concentration of 2 mass %, and except for using a non-aqueous electrolyte solvent for a battery electrolyte liquid which was prepared by mixing the ionic liquid and FEC in the ratio of 98 parts by mass and 2 parts by mass. The results of evaluating the secondary battery are shown in Table 2.

Example 8

A secondary battery was fabricated in the same manner as Example 3, except that BPM-TFSI was used as an ionic liquid instead of EMI-TFSI. The results of evaluating the secondary battery are shown in Table 2.

Example 9

A secondary battery was fabricated in the same manner as Example 3, except that TEMEP-TFSI was used as an ionic liquid instead of EMI-TFSI. The results of evaluating the secondary battery are shown in Table 2.

Example 10

A secondary battery was fabricated in the same manner as Example 3, except that TES-TFSI was used as an ionic liquid instead of EMI-TFSI. The results of evaluating the secondary battery are shown in Table 2.

Example 11

A secondary battery was fabricated in the same manner as Example 3, except for using a negative electrode active substance which was prepared by mixing said silicon, amorphous silicon oxide and graphite at the mass ratio of 28:52:20. The results of evaluating the secondary battery are shown in Table 2.

Example 12

A secondary battery was fabricated in the same manner as Example 3, except for using a negative electrode active substance which was prepared by mixing said silicon, amorphous silicon oxide and graphite at the mass ratio of 25:50:25. The results of evaluating the secondary battery are shown in Table 2.

Example 13

A negative electrode active substance which contained silicon, an amorphous silicon oxide ($SiO_x$, $0<x\leq2$) and a carbon at a mass ratio of 30:55:15 was obtained by the same method described in Patent document 3. Note that, in this negative electrode active substance, the silicon that is metal (a) was dispersed in the amorphous silicon oxide that is metal oxide (b). Then, the example was carried out in the same manner as Example 3 except that this negative electrode active substance was used. The results are shown in TABLE 2.

Comparative Example 1

A secondary battery was fabricated and evaluated in the same manner as Example 1, except for using the negative electrode structure described in Example 1 as a negative electrode, and except for using a battery electrolyte liquid which contains only the non-fluorinated carbonate compound as a non-aqueous electrolyte solvent and which contains $LiPF_6$ (1M) as a supporting salt instead of LiTFSI. The results are shown in Table 2.

Comparative Example 2

A secondary battery was fabricated and evaluated in the same manner as Example 1, except for using the negative electrode structure described in Example 1 as a negative electrode, and except for using a battery electrolyte liquid which contains only the non-fluorinated carbonate compound as a non-aqueous electrolyte solvent. The results are shown in Table 2.

Comparative Example 3

A secondary battery was fabricated and evaluated in the same manner as Example 1, except for using the negative electrode structure described in Example 1 as a negative electrode. The results are shown in Table 2.

Comparative Example 4

A secondary battery was fabricated and evaluated in the same manner as Example 2, except for using the negative electrode structure described in Example 1 as a negative electrode. The results are shown in Table 2.

Comparative Example 5

A secondary battery was fabricated and evaluated in the same manner as Comparative example 4, except for using a battery electrolyte liquid which contains $LiPF_6$ (1M) as a supporting salt instead of LiTFSI. The results are shown in Table 2.

Comparative Example 6

A secondary battery was fabricated and evaluated in the same manner as Example 6, except for using the negative electrode structure described in Example 1 as a negative electrode. The results are shown in Table 2.

Comparative Example 7

A secondary battery was fabricated and evaluated in the same manner as Example 7, except for using the negative electrode structure described in Example 1 as a negative electrode, and except for using a battery electrolyte liquid which contains only an ionic liquid as a non-aqueous electrolyte solvent. The results are shown in Table 2.

Comparative Example 8

A secondary battery was fabricated and evaluated in the same manner as Example 8, except for the negative electrode structure described in Example 1 as a negative electrode. The results are shown in Table 2.

TABLE 1

| | negative electrode | | | | battery electrolyte liquid | | | | | |
|---|---|---|---|---|---|---|---|---|---|---|
| | | | | | | | | non-aqueous electrolyte solvent | | |
| | negative electrode active substance | negative electrode binder (PI) | SEI coating film | FEC | supporting salt | | ionic liquid | | non-fluorinated carbonate compound | fluorinated cyclic-type carbonate (FEC) |
| | Si/SiO/C ratio | content (%) | formation | content (%) | kind | concentration (M) | kind | content (%) | content (%) | content (%) |
| Example 1 | 30/55/15 | 15 | o | — | LiTFSI | 0.8 | EMI-TFSI | 20 | 80 | — |
| Example 2 | 30/55/15 | 15 | o | — | LiTFSI | 0.8 | EMI-TFSI | 40 | 60 | — |
| Example 3 | 30/55/15 | 15 | o | 2 | LiTFSI | 0.8 | EMI-TFSI | 40 | 60 | — |
| Example 4 | 30/55/15 | 15 | o | — | LiTFSI | 0.8 | EMI-TFSI | 40 | 58 | 2 |
| Example 5 | 30/55/15 | 15 | o | 2 | LiTFSI | 0.8 | EMI-TFSI | 40 | 58 | 2 |
| Example 6 | 30/55/15 | 15 | o | 2 | LiTFSI | 0.8 | EMI-TFSI | 60 | 40 | — |
| Example 7 | 30/55/15 | 15 | o | 2 | LiTFSI | 0.8 | EMI-TFSI | 98 | 0 | 2 |
| Example 8 | 30/55/15 | 15 | o | 2 | LiTFSI | 0.8 | BMP-TFSI | 40 | 60 | — |
| Example 9 | 30/55/15 | 15 | o | 2 | LiTFSI | 0.8 | TEMEP-TFSI | 40 | 60 | — |
| Example 10 | 30/55/15 | 15 | o | 2 | LiTFSI | 0.8 | TES-TFSI | 40 | 60 | — |
| Example 11 | 28/52/20 | 15 | o | 2 | LiTFSI | 0.8 | EMI-TFSI | 40 | 60 | — |
| Example 12 | 25/50/25 | 15 | o | 2 | LiTFSI | 0.8 | EMI-TFSI | 40 | 60 | — |
| Comp. example 1 | 30/55/15 | 15 | x | — | LiPF6 | 1 | — | — | 100 | — |
| Comp. example 2 | 30/55/15 | 15 | x | — | LiTFSI | 0.8 | — | — | 100 | — |
| Comp. example 3 | 30/55/15 | 15 | x | — | LiTFSI | 0.8 | EMI-TFSI | 20 | 80 | — |
| Comp. example 4 | 30/55/15 | 15 | x | — | LiTFSI | 0.8 | EMI-TFSI | 40 | 60 | — |
| Comp. example 5 | 30/55/15 | 15 | x | — | LiPF6 | 1 | EMI-TFSI | 40 | 60 | — |

TABLE 1-continued

| | negative electrode | | | | battery electrolyte liquid | | | | |
|---|---|---|---|---|---|---|---|---|---|
| | | | | | | non-aqueous electrolyte solvent | | | |
| | negative electrode active substance | negative electrode binder (PI) | SEI coating film | | supporting salt | | ionic liquid | non-fluorinated carbonate compound | fluorinated cyclic-type carbonate (FEC) |
| | Si/SiO/C ratio | content (%) | formation | FEC content (%) | kind | concentration (M) | kind / content (%) | content (%) | content (%) |
| Comp. example 6 | 30/55/15 | 15 | x | — | LiTFSI | 0.8 | EMI-TFSI / 60 | 40 | — |
| Comp. example 7 | 30/55/15 | 15 | x | — | LiTFSI | 0.8 | EMI-TFSI / 100 | 0 | — |
| Comp. example 8 | 30/55/15 | 15 | x | — | LiTFSI | 0.8 | BMP-TFSI / 40 | 60 | — |

TABLE 2

| | Cycle test maintenance rate (%) | Flame retardancy test |
|---|---|---|
| Example 1 | 91 | non-flammable |
| Example 2 | 90 | non-flammable |
| Example 3 | 95 | non-flammable |
| Example 4 | 92 | non-flammable |
| Example 5 | 97 | non-flammable |
| Example 6 | 94 | non-flammable |
| Example 7 | 93 | non-flammable |
| Example 8 | 96 | non-flammable |
| Example 9 | 93 | non-flammable |
| Example 10 | 90 | non-flammable |
| Example 11 | 96 | non-flammable |
| Example 12 | 97 | non-flammable |
| Example 13 | 96 | non-flammable |
| Comparative example 1 | 98 | flammable |
| Comparative example 2 | 3 | flammable |
| Comparative example 3 | 38 | non-flammable |
| Comparative example 4 | 10 | non-flammable |
| Comparative example 5 | 9 | non-flammable |
| Comparative example 6 | 6 | non-flammable |
| Comparative example 7 | 0 | non-flammable |
| Comparative example 8 | 27 | non-flammable |

Discussion

In order to impart flame retardancy to an electrolyte liquid comprising carbonate compounds such as EC and DEC, some of non-volatile ionic liquid having flame retardancy should be mixed. For example, since an ionic liquid comprising TFSI anion has high thermal-decomposition temperature and relatively high thermal stability, a carbonate compound comprising 20% EMI-TFSI showed flame retardancy (Comparative examples 1 and 2; Example 1). This effect may be also applied to cases of using imide anions such as BETI or C-TFSI, and likewise high thermal stability may be achieved.

However, in the case where the ratio of an ionic liquid mixed in the electrolyte liquid is increased, cycle maintenance tends to deteriorate (Comparative examples 3, 4, 5 and 6). This reason is assumed that an ionic liquid which has a low reduction resistance and is susceptible to decomposition is decomposed on a surface of an electrode to form a nonconductive coating film on the surface, and thereby inhibit later electrode reactions.

To the contrary, we found that excellent cycle property was obtained by using a negative electrode having a coating film pre-formed thereon even when a large amount of an ionic liquid was mixed in the electrolyte liquid (Example 2, Comparative example 4).

Further, we found that when pre-forming a coating film with the electrolyte liquid comprising a carbonate compound, a better coating film could be formed by adding a fluorinated cyclic-type compound such as FEC in the electrolyte liquid, and consequently the decomposition of an ionic liquid could be more prevented and the improvement of cycle maintenance could be achieved (Example 3). Thus, the negative electrode had better property as compared to the negative electrode which had surface coating film formed with only carbonate-based electrolyte liquid (Examples 2 and 3).

Further, we found that cycle maintenance could be more improved by using a negative electrode having a coating film formed with an electrolyte liquid in which a fluorinated cyclic-type carbonate compound such as FEC was added and by using an electrolyte liquid in which a fluorinated cyclic-type carbonate compound such as FEC was added (Example 5). The same results were also obtained when using ionic liquids comprising other cations, and therefore the high improvement of cycle maintenance may be expected (Examples 8, 9 and 10).

The present application claims the priority based on Japanese Patent Application No. 2010-243939, filed on Oct. 29, 2010, all the disclosure of which is incorporated herein by reference.

The present invention was explained with reference to embodiments and Examples, but the present invention is not limited to the above-mentioned embodiments and the Examples. In the constituents and the detail of the present invention, various changings which are understood by a person ordinarily skilled in the art can be made within the scope of the invention.

INDUSTRIAL APPLICABILITY

An exemplary embodiment of the invention can be utilized in every industrial field that requires a power supply and in an industrial field concerning a transportation, a storage and a supply of an electrical energy. Specifically, it can be utilized, for examples, for a power supply of a mobile device such as a mobile phone and a laptop computer; a power supply of a moving or a transport medium such as a train, a satellite and a submarine, and which includes an electric vehicle such as an electric car, a hybrid car, an electric motorcycle and an electric power-assisted bicycle; a back-up power supply such as UPS; and a power storage device of an electric power which is generated by solar power generation or wind power generation.

REFERENCE SIGNS LIST a: negative electrode
b: separator
c: potive electrode
d: negative electrode current collector
e: potive electrode current collector
f: potive electrode terminal
g: negative electrode terminal

What is claimed is:

1. A secondary battery, comprising a negative electrode and a battery electrolyte liquid comprising a first supporting salt and a non-aqueous electrolyte solvent;
wherein the negative electrode comprises a negative electrode structure and a pre-formed SEI coating film on the negative electrode structure,
wherein the negative electrode structure contains a negative electrode active substance, a negative electrode collector and a negative electrode binder which binds the negative electrode active substance to the negative electrode collector,
wherein the pre-formed SEI coating film is formed before an initial charge/discharge of the secondary battery,
wherein the negative electrode active substance comprises a metal (a) that can be alloyed with lithium, a metal oxide (b) that can absorb and desorb lithium ions and a carbon material (c) that can absorb and desorb lithium ions,
wherein the non-aqueous electrolyte solvent contains at least an ionic liquid,
wherein the non-aqueous electrolyte solvent comprises a first fluorinated carbonate compound and a first non-fluorinated carbonate compound,
wherein a content of the first fluorinated carbonate compound in the non-aqueous electrolyte solvent is 0.1 to 10 mass %,
wherein a total content of components in the non-aqueous electrolyte solvent other than the first fluorinated carbonate compound is 90 to 99.9 mass %,
wherein the first supporting salt consists of $LiPF_6$ or $LiN(CF_3SO_2)_2$,
wherein the first supporting salt is a single lithium salt species,
wherein a content of the first non-fluorinated carbonate compound in the non-aqueous electrolyte solvent is 58 to 90 mass %, and
wherein the pre-formed SEI coating film is formed by an electrode reaction with a coating film-forming electrolyte liquid consisting essentially of a second non-fluorinated carbonate compound, a second fluorinated carbonate compound and a second supporting salt, and the second non-fluorinated carbonate compound comprises a non-fluorinated cyclic carbonate compound.

2. The secondary battery according to claim 1, wherein the second fluorinated carbonate compound in the coating film-forming electrolyte liquid is a second fluorinated cyclic carbonate compound.

3. The secondary battery according to claim 2, wherein the second fluorinated cyclic carbonate compound is fluoroethylene carbonate.

4. The secondary battery according to claim 1, wherein a content of the ionic liquid in the non-aqueous electrolyte solvent is 10 mass % or more.

5. The secondary battery according to claim 1, wherein a content of the ionic liquid in the non-aqueous electrolyte solvent is 10 to 90 mass.

6. The secondary battery according to claim 1, wherein the first fluorinated carbonate compound comprised in the non-aqueous electrolyte solvent is a first fluorinated cyclic carbonate compound.

7. The secondary battery according to claim 6, wherein the first fluorinated cyclic carbonate compound is fluoroethylene carbonate.

8. The secondary battery according to claim 1, wherein a content of the ionic liquid in the non-aqueous electrolyte solvent is 10 to 99.9 mass %.

9. The secondary battery according to claim 1, wherein a content of the ionic liquid in the non-aqueous electrolyte solvent is 20 to 89.9 mass %, a content of the first non-fluorinated carbonate compound in the non-aqueous electrolyte solvent is 58 to 79.9 mass %.

10. The secondary battery according to claim 1, wherein all or a part of the metal oxide (b) has an amorphous structure.

11. The secondary battery according to claim 1, wherein the metal oxide (b) is an oxide of metal which constitutes the metal (a).

12. The secondary battery according to claim 1, wherein metal (a) is silicon.

13. The secondary battery according to claim 1, wherein all or a part of the metal (a) is dispersed in the metal oxide (b).

14. The secondary battery according to claim 1, wherein the negative electrode binder is a polyimide or a polyamide-imide.

15. The secondary battery according to claim 1, wherein an electrode assembly comprising a positive electrode and the negative electrode has a planar stacked structure, and a package accommodating the electrode assembly and the battery electrolyte liquid is a laminate film.

16. A method for manufacturing a secondary battery including a negative electrode and a battery electrolyte liquid comprising a first supporting salt and a non-aqueous electrolyte solvent, the method comprising:
forming a negative electrode structure by binding a negative electrode active substance comprising a metal (a) that can be alloyed with lithium, a metal oxide (b) that can absorb and desorb lithium ions and a carbon material (c) that can absorb and desorb lithium ions, to a negative electrode current collector with a negative electrode binder,
forming a SEI coating film on the negative electrode structure by an electrode reaction with a coating film-forming electrolyte liquid consisting essentially of a second non-fluorinated carbonate compound, a second fluorinated carbonate compound and a second supporting salt, and the second non-fluorinated carbonate compound comprising a non-fluorinated cyclic carbonate compound, to obtain the negative electrode, and assembling the secondary battery using the negative electrode having the SEI coating film formed and the battery electrolyte liquid, wherein the non-aqueous electrolyte solvent of the battery electrolyte liquid contains at least an ionic liquid, wherein a content of the first fluorinated carbonate compound in the non-aqueous electrolyte solvent is 0.1 to 10 mass %, wherein a total content of components in the non-aqueous electrolyte solvent other than the first fluorinated carbonate compound is 90 to 99.9 mass %, wherein the first supporting salt consists of $LiPF_6$ or $LiN(CF_3SO_2)_2$, wherein the first supporting salt is a single lithium salt species, and wherein a content of the first non-fluorinated carbonate compound in the non-aqueous electrolyte solvent is 58 to 90 mass %.

17. The secondary battery according to claim 1, wherein the content of a Si containing active substance in the negative electrode active substance is 75 to 85 mass %, wherein the first supporting salt is $LiN(CF_3SO_2)_2$, and wherein the ionic liquid is a compound selected from the group consisting of 1-ethyl-3-methylimidazolium bis(trifluoromethanesulfonyl)imide (EMI-TFSI), 1-butyl-1-methylpyrrolidinium bis(trifluoromethanesulfonyl)imide (BMP-TFSI), and triethylmethoxyethylphosphonium bis(trifluoromethanesulfonyl)imide (TEMEP-TFSI).

18. The secondary battery according to claim 1, wherein the negative electrode active substance comprises Si and SiO, wherein the first supporting salt is $LiN(CF_3SO_2)_2$, and wherein the ionic liquid is a compound selected from the group consisting of 1-ethyl-3-methylimidazolium bis(trifluoromethanesulfonyl)imide (EMI-TFSI), 1-butyl-1-methylpyrrolidinium bis(trifluoromethanesulfonyl)imide (BMP-TFSI), and triethylmethoxyethylphosphoniumbis (trifluoromethanesulfonyl)imide (TEMEP-TFSI).

19. The method for manufacturing a secondary battery according to claim 16, wherein the content of a Si containing active substance in the negative electrode active substance is 75 to 85 mass %, wherein the first supporting salt is $LiN(CF_3SO_2)_2$, and wherein the ionic liquid is a compound selected from the group consisting of 1-ethyl-3-methylimidazolium bis(trifluoromethanesulfonyl)imide (EMI-TFSI), 1-butyl-1-methylpyrrolidinium bis(trifluoromethanesulfonyl)imide (BMP-TFSI), and triethylmethoxyethylphosphonium bis(trifluoromethanesulfonyl)imide (TEMEP-TFSI).

20. The method for manufacturing a secondary battery according to claim 16, wherein the negative electrode active substance comprises Si and SiO, wherein the first supporting salt is $LiN(CF_3SO_2)_2$, and wherein the ionic liquid is a compound selected from the group consisting of 1-ethyl-3-methylimidazolium bis(trifluoromethanesulfonyl)imide (EMI-TFSI), 1-butyl-1-methylpyrrolidinium bis(trifluoromethanesulfonyl)imide (BMP-TFSI), and triethylmethoxyethylphosphonium bis(trifluoromethanesulfonyl)imide (TEMEP-TFSI).

21. A secondary battery, comprising a negative electrode and a battery electrolyte liquid comprising a first supporting salt and a non-aqueous electrolyte solvent;

wherein the negative electrode comprises a negative electrode structure and a pre-formed SEI coating film on the negative electrode structure, wherein the negative electrode structure contains a negative electrode active substance, a negative electrode collector and a negative electrode binder which binds the negative electrode active substance to the negative electrode collector, wherein the pre-formed SEI coating film is formed before an initial charge/discharge of the secondary battery, wherein the negative electrode active substance comprises a metal (a) that can be alloyed with lithium, a metal oxide (b) that can absorb and desorb lithium ions and a carbon material (c) that can absorb and desorb lithium ions, wherein the non-aqueous electrolyte solvent contains at least an ionic liquid, wherein the content of a Si containing active substance in the negative electrode active substance is 75 to 85 mass %, wherein the first supporting salt is $LiN(CF_3SO_2)_2$, wherein the ionic liquid is a compound selected from the group consisting of 1-ethyl-3-methylimidazoliumbis(trifluoromethanesulfonyl)imide (EMI-TFSI), and 1-butyl-1-methylpyrrolidinium bis(trifluoromethanesulfonyl)imide (BMP-TFSI), wherein the non-aqueous electrolyte solvent comprises a first non-fluorinated carbonate compound, wherein the first supporting salt is a single lithium salt species, and wherein a content of the first non-fluorinated carbonate compound in the non-aqueous electrolyte solvent is 58 to 90 mass %, and wherein the pre-formed SEI coating film is formed by an electrode reaction with a coating film-forming electrolyte liquid consisting essentially of a second non-fluorinated carbonate compound, and a fluorinated carbonate compound and a second supporting salt, and the second non-fluorinated carbonate compound comprises a non-fluorinated cyclic carbonate compound.

22. A secondary battery, comprising a negative electrode and a battery electrolyte liquid comprising a first supporting salt and a non-aqueous electrolyte solvent;

wherein the negative electrode comprises a negative electrode structure and a pre-formed SEI coating film on the negative electrode structure, wherein the negative electrode structure contains a negative electrode active substance, a negative electrode collector and a negative electrode binder which binds the negative electrode active substance to the negative electrode collector, wherein the pre-formed SEI coating film is formed before an initial charge/discharge of the secondary battery, wherein the negative electrode active substance comprises a metal (a) that can be alloyed with lithium, a metal oxide (b) that can absorb and desorb lithium ions and a carbon material (c) that can absorb and desorb lithium ions, wherein the negative electrode active substance comprises Si and SiO, wherein the first supporting salt is $LiN(CF_3SO_2)_2$, and wherein the ionic liquid is a compound selected from the group consisting of 1-ethyl-3-methylimidazoliumbis(trifluoromethanesulfonyl)imide (EMI-TFSI), and 1-butyl-1-methylpyrrolidinium bis(trifluoromethanesulfonyl)imide (BMP-TFSI), wherein the non-aqueous electrolyte solvent comprises a non-fluorinated carbonate compound, wherein the first supporting salt is a single lithium salt species, and wherein a content of the non-fluorinated carbonate compound in the non-aqueous electrolyte solvent is 58 to 90 mass %, and wherein the pre-formed SEI coating film is formed by an electrode reaction with a coating film-forming electrolyte liquid consisting essentially of a second non-fluorinated carbonate compound, and a fluorinated carbonate compound and a second supporting salt, and the second non-fluorinated carbonate compound comprises a non-fluorinated cyclic carbonate compound.

* * * * *

UNITED STATES PATENT AND TRADEMARK OFFICE
CERTIFICATE OF CORRECTION

PATENT NO. : 10,290,894 B2  
APPLICATION NO. : 13/881984  
DATED : May 14, 2019  
INVENTOR(S) : Kazuaki Matsumoto et al.

Page 1 of 1

It is certified that error appears in the above-identified patent and that said Letters Patent is hereby corrected as shown below:

In the Specification

Column 8, Description of Embodiments, Line 34; Delete "($1 \leq + \leq 1.2$," and insert --($1 \leq \alpha \leq 1.2$,-- therefor Column 8, Description of Embodiments, Line 35; Delete "$\delta \geq 0.7$," and insert --$\beta \geq 0.7$,-- therefor In the Claims Column 21, Lines 35-36; In Claim 18, delete "I-butyl-1-methylpyrrolidinium" and insert --1-butyl-1-methylpyrrolidinium-- therefor Column 22, Line 19; In Claim 21, delete "1-ethyl-3-methylimidazoliumbis" and insert --1-ethyl-3-methylimidazolium bis-- therefor Column 22, Line 60; In Claim 22, delete "1-ethyl-3-methylimidazoliumbis" and insert --1-ethyl-3-methylimidazolium bis-- therefor Signed and Sealed this  
Twenty-seventh Day of August, 2019

Andrei Iancu  
*Director of the United States Patent and Trademark Office*